Figure 1:
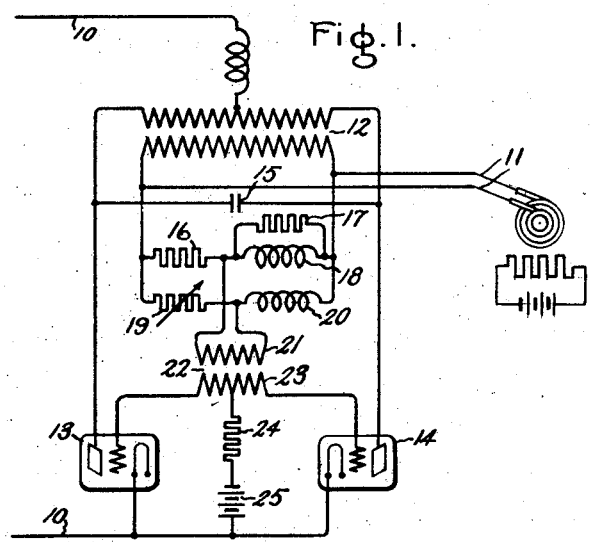

March 14, 1933.    B. D. BEDFORD    1,901,694

PHASE SHIFTING CIRCUITS

Filed Aug. 27, 1930

Inventor:
Burnice D Bedford,
by Charles E. Tullar
His Attorney.

Patented Mar. 14, 1933

1,901,694

UNITED STATES PATENT OFFICE

BURNICE D. BEDFORD, OF SCHENECTADY, NEW YORK, ASSIGNOR TO GENERAL ELECTRIC COMPANY, A CORPORATION OF NEW YORK

PHASE SHIFTING CIRCUITS

Application filed August 27, 1930. Serial No. 478,163.

My invention relates to electric circuits for shifting the phase of an alternating potential derived from a source with respect to the potential of that source and more particularly to such electric circuits by means of which a shift in phase of 180° and more may be obtained by variation of the circuit elements within practical limits.

My invention is of general application in electric control and regulating systems although it is particularly adapted for use in connection with electric power converting apparatus for transmitting energy between direct current and alternating current systems, or between two alternating current systems by the use of electric valves. In such apparatus it is customary to control the transmission of power between the direct current and the alternating current systems by shifting the phase of the potentials applied to the control grids of the electric valves with respect to their anode potentials. Various arrangements have been provided heretofore to effect this phase shift of the grid potential. Static phase shifters, that is, electric circuits including various combinations of resistance, reactance, and capacitance have proved to be most satisfactory from the standpoint of simplicity, economy and reliability. In the static phase shifting circuit heretofore devised, it has been necessary to vary one of the circuit elements from zero to infinity in order to secure a complete 180° phase shift, which is often desirable in order to provide the maximum flexibility in the control of the power converting apparatus. Obviously such a wide variation in a circuit element is a practical impossibility and even in order to secure a reasonable range of phase shift it has been necessary to vary the circuit elements over extremely wide limits.

It is an object of my invention to overcome the disadvantages above noted in connection with static phase shifting circuits and to provide such a circuit in which the desired phase shift of 180° can be secured without extreme variations in the circuit elements.

It is a further object of my invention to provide a static phase shifting circuit by means of which a shift in phase of more than 180° can be obtained by a moderate variation of only one of the circuit elements.

According to my invention I provide a pair of parallel connected circuits, each of which is made up of a plurality of impedance elements. When an alternating potential is applied to the circuit terminals, the several impedance elements produce phase differences in their component potentials. These impedance elements are so proportioned that a greater phase difference is produced in one circuit than the other. At least one of the impedance elements is made variable so that the phase of its component potential may be varied with respect to the applied potential or with respect to the component potential of the other circuit element. The desired potential of variable phase is obtained between intermediate points of these two parallel circuits.

For a better understanding of my invention together with other and further objects thereof, reference is had to the following description taken in connection with the accompanying drawing, and those features which I consider novel and patentable and within the scope of my invention will be pointed out with more particularity in the appended claims.

Figure 2:
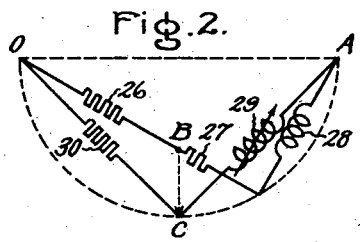
Figure 3:
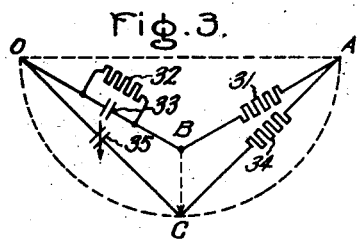
Figure 4:
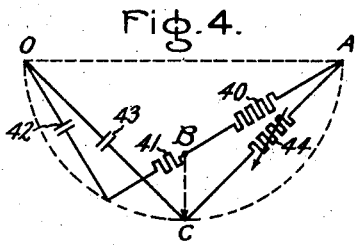

In the accompanying drawing Fig. 1 is a diagrammatic illustration of my invention as applied to an electric power converting apparatus adapted to convert direct current into alternating current. Figs. 2, 3 and 4 represent other embodiments of my invention and Fig. 5 is a vector diagram to aid in the understanding of my invention.

Referring to Fig. 1 of the drawing, I have illustrated a direct current circuit 10, interconnected with an alternating current circuit 11 by a transformer 12 and electric valves 13 and 14. The electric valves 13 and 14 may be of any of the several types well known in the art, but I prefer to use vapor electric discharge devices in which the starting of the current through the device is dependent upon the potential of the control grid but in which the current in the device may be interrupted only by reducing the anode voltage below its critical value. A commutating capacitor 15 is connected between the anodes of the electric valves 13 and 14 to facilitate the transfer of current between them. As is well understood by those skilled in the art the amount of power transmitted between the direct current circuit 10 and the alternating current circuit 11 can be controlled by controlling the phase of the potentials applied between the grid and the cathode of each of the valves 13 and 14 with respect to their anode potentials. In order to control the phase of the grid potentials with respect to the anode potentials, I have shown a phase shifting circuit comprising two parallel circuits connected across the alternating current circuit. The first of these parallel circuits includes a resistor 16 connected in series with the parallel circuit made up of a resistor 17 and a reactor 18. The second of the parallel circuits includes a variable resistor 19 and a reactor 20. The primary winding 21 of a grid transformer 22 is connected between the midpoint of the two parallel circuits. The secondary winding 23 of this transformer is provided with a midtap which is connected to the cathodes of the valves 13 and 14 through a current limiting resistor 24 and a negative bias battery 25, while its terminals are connected to the grids of the electric valves 13 and 14. By varying the magnitude of the resistor 19 within moderate limits, the phase of the potential applied to the grid of the valves 13 and 14 may be varied more than 180°. This may be understood more clearly by reference to Fig. 5.

Figure 5:
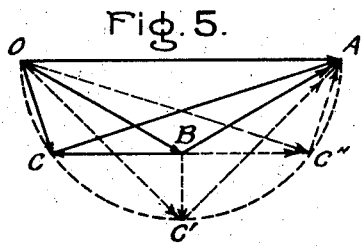

Referring to Fig. 5 the vector OA represents the alternating potential which is applied to the phase shifting circuit. The vector OB represents the potential across the resistor 16 and the vector BA the voltage across the parallel circuit comprising the resistor 17 and the reactor 18. Assume that the value of the resistance 19 is varied until the grid potential is 180° out of phase with the anode potential. Under this condition the potential across the resistor 19 is represented by the vector OC and the potential across the reactor 20, by the vector CA. Obviously the vector BC represents the potential applied to the primary winding 21 of the grid transformer 22. If the resistor 19 is pure resistance and the reactor 20 is pure inductance the potentials across these two circuit elements will always differ by 90° in phase and the locus of the point C will be the semi-circle of which OA is the diameter. Consequently the voltage BC applied to the primary winding 21 of the grid transformer will be represented by the vectors BC′, BC″, etc. With the arrangement just described it has been found that a 180° phase shift may be obtained with a twelve to one variation in the value of the resistance 19 which is of course within easily obtainable, practical limits. It will be seen also from Fig. 5 that a maximum theoretical phase shift of about 240° can be obtained by a variation in the value of one of the circuit elements from zero to infinity. Hence a value which is intermediate 180° and 240° can be obtained if a variation of one of the circuit elements of more than 12:1 is permissible.

While I have shown the impedance of the resistor 16 as equal to that of the circuit made up of the resistor 17 and the reactor 18 so that the vector OB is equal to the vector BA, it will be obvious to those skilled in the art that these two portions of the circuit may have unequal impedance values if the special problems of any particular application require it. It will also be obvious to those skilled in the art that one of the elements 16, 17 or 18 may be made variable so as to obtain additional flexibility in the control.

In Fig. 2 I have illustrated another embodiment of my invention in which one of the parallel circuits comprises the resistor 26, the resistor 27 and the reactor 28 while the other circuit comprises the resistor 30 and the variable reactor 29. As before, the vector BC represents the voltage applied to the primary winding 21 of the grid transformer.

In Fig. 3 I have illustrated another embodiment of my invention in which one of the parallel circuits comprises a resistor 31 and a resistor 32 and capacitor 33 connected in parallel, while the other circuit is made up of a resistor 34 and a variable capacitor 35.

Fig. 4 represents a still further modification of my invention in which one of the circuits is made up of a resistor 40, a resistor 41 and a capacitor 42, while the other circuit comprises a capacitor 43 and a variable resistor 44. From the above explanation it will be seen that it is only necessary that the point B, which corresponds to the junction of the component potential vectors across the impedance elements of one series circuit, lie within the locus of the point C, the junction of the component potential vectors across the impedance elements of the other series circuit. In the particular modifications illustrated, the locus of the point C is the dotted line semi-circle of which the vector OA is the diameter, as explained above.

While I have shown and described what I at present consider the preferred embodiment of my invention, it will be obvious to those skilled in the art that various changes and modifications may be made without departing from my invention and I therefore aim in the appended claims to cover all such changes and modifications as fall within the true spirit and scope of my invention.

What I claim as new and desire to secure by Letters Patent of the United States, is:

1. In an electrical control system including an electric valve provided with an anode, a cathode, and a control grid, a source of periodic anode potential and means for impressing upon said grid a potential variable in phase with respect to said source comprising a plurality of impedance elements serially connected across said source for producing dephased potentials, a plurality of other impedance elements one of which is variable, serially connected in parallel to said first mentioned impedance elements for producing other dephased potentials, and a grid circuit including a potential derived from intermediate points of said parallel circuits.

2. In combination with a source of periodic potential, apparatus for producing a potential variable in phase with respect to said source comprising a plurality of impedance elements serially connected across said source for producing dephased potentials, a plurality of other impedance elements, one of which is variable, serially connected in parallel to said first mentioned impedance elements for producing other dephased potentials, corresponding elements of said parallel circuits having similar reactive characteristics, and an output circuit connected to intermediate points of said parallel circuits.

3. In combination with a source of periodic potential, apparatus for producing a potential variable in phase with respect to said source comprising a plurality of impedance elements serially connected across said source for producing dephased potentials, a plurality of other impedance elements, one of which is variable, serially connected in parallel to said first mentioned impedance elements for producing potentials having a greater phase difference than that of the potentials of said first circuit, and an output circuit connected to intermediate points of said parallel circuits.

4. In combination with a source of periodic potential, apparatus for producing a potential variable in phase with respect to said source comprising a plurality of impedance elements serially connected across said source for producing component potentials having a phase difference substantially less than 90°, a plurality of other impedance elements, one of which is variable, serially connected in parallel to said first mentioned impedance elements for producing component potentials having a phase difference of substantially 90°, and an output circuit connected to intermediate points of said parallel circuits.

5. In combination with a source of periodic potential, apparatus for producing a potential variable in phase with respect to said source comprising a plurality of impedance elements serially connected across said source for producing dephased potentials, a resistive and a reactive impedance, one of which is variable, serially connected in parallel to said impedance elements, and an output circuit connected to intermediate points of said parallel circuits.

6. In combination with a source of periodic potential, apparatus for producing a potential variable in phase with respect to said source comprising a plurality of impedance elements serially connected across said source for producing dephased potentials, a substantially non-reactive resistance and a substantially non-resistive reactance, one of which is variable, serially connected in parallel to said impedance elements, and an output circuit connected to intermediate points of said parallel circuits.

7. In combination with a source of periodic potential, apparatus for producing a potential variable in phase with respect to said source comprising a two part fixed impedance series circuit connected across said source, said parts having unequal reactive components, a plurality of impedance elements, one of which is variable, serially connected in parallel to said circuit, and an output circuit connected from an intermediate point in said second circuit to the intermediate connection of said first circuit.

8. In combination with a source of periodic potential, apparatus for producing a potential variable in phase with respect to said source comprising a two-part series circuit connected across said source, said parts having equal fixed impedances of different reactive components, a plurality of impedance elements, one of which is variable, serially connected in parallel to said circuit, and an output circuit connected from an intermediate point in said second circuit to the intermediate connection of said first circuit.

9. In combination with a source of periodic potential, apparatus for producing a potential variable in phase with respect to said source comprising a two part fixed impedance series circuit connected across said source one of said parts including resistance and reactance and the other including only one component of impedance, a plurality of impedance elements, one of which is variable, serially connected in parallel to said circuit, and an output circuit connected from an intermediate point in said second circuit to the intermediate connection of said first circuit.

10. In combination with a source of periodic potential, apparatus for producing a potential variable in phase with respect to said source comprising a two part fixed impedance series circuit connected across said source, one of said parts including resistance and reactance and the other including only resistance, a plurality of impedance elements, one of which is variable, serially connected in parallel to said circuit, and an output circuit connected from an intermediate point in said second circuit to the intermediate connection of said first circuit.

11. In combination with a source of periodic potential, apparatus for producing a potential variable in phase with respect to said source comprising an impedance in series with a parallel circuit including resistance and reactance connected across said source, a plurality of impedance elements, one of which is variable, serially connected in parallel to said circuit, and an output circuit connected from an intermediate point in said second circuit to the intermediate connection of said first circuit.

12. In combination with a source of periodic potential, apparatus for producing a potential variable in phase with respect to said source comprising a series circuit across said source including a resistance and a parallel connected resistance and inductance, a plurality of impedance elements, one of which is variable, serially connected in parallel to said circuit, and an output circuit connected from an intermediate point in said second circuit to the intermediate connection of said first circuit.

13. In combination with a source of periodic potential, apparatus for producing a potential variable in phase with respect to said source comprising a two part series circuit across said source, said parts including an impedance and a series connected resistance and reactance respectively, a plurality of impedance elements, one of which is variable, serially connected in parallel to said circuit, and an output circuit connected from an intermediate point in said second circuit to the intermediate connection of said first circuit.

14. In combination with a source of periodic potential, apparatus for producing a potential variable in phase with respect to said source comprising a two part series circuit across said source, said parts including a resistance and a series connected resistance and inductance respectively, a plurality of impedance elements, one of which is variable, serially connected in parallel to said circuit, and an output circuit connected from an intermediate point in said second circuit to the intermediate connection of said first circuit.

15. In combination with a source of alternating potential, apparatus for producing a potential variable in phase with respect to said source comprising a plurality of fixed impedance elements serially connected across said source for producing dephased voltages, a resistance and an inductance, one of which is variable, serially connected in parallel to said impedance elements, and an output circuit connected to intermediate points of said parallel circuits.

16. In combination with a source of alternating potential, apparatus for producing a potential variable in phase with respect to said source comprising a plurality of fixed impedance elements serially connected across said source for producing dephased voltages, a resistance and capacitance, one of which is variable, serially connected in parallel to said impedance elements, and an output circuit connected to intermediate points of said parallel circuits.

17. In combination with a source of periodic potential, apparatus for producing a potential variable in phase with respect to that of said source comprising a plurality of impedance elements serially connected across said source for producing dephased potentials, one of said elements being variable and the junction of the component potential vectors across said elements describing a predetermined locus with variations of said variable element, a plurality of other serially connected impedance elements connected in circuit with said source for producing other dephased potentials, the junction of the component potential vectors across said last mentioned elements lying within said locus, and an output circuit connected between the junction points of said series circuits.

18. In combination with a source of alternating potential, apparatus for producing a potential variable in phase with respect to that of said source comprising a plurality of impedance elements serially connected across said source for producing component potentials displaced in phase substantially 90 degrees, one of said elements being variable and the locus of the junction of the component potential vectors across said impedance elements with variations of said variable element being a semi-circle, a plurality of other serially connected impedance elements connected in circuit with said source for producing other dephased potentials, the junction of the component potential vectors across said last mentioned elements lying within said semi-circle, and an output circuit connected between the junction points of said series circuits.

19. In combination with a source of periodic potential, apparatus for producing a potential variable in phase with respect to that of said source comprising a plurality of impedance elements serially connected across said source for producing dephased potentials, a plurality of other serially connected impedance elements connected in circuit with said source for producing other dephased potentials, the resistance and reactance of the several impedance elements being so proportioned that the junctions of the component potential vectors across the impedance elements of the two series circuits lie on the same side of the potential vector of said supply circuit, means for varying the impedance of one of said elements, and an output circuit connected between the junction points of said series circuits.

In witness whereof I have hereunto set my hand this 26th day of August, 1930.

BURNICE D. BEDFORD.